United States Patent
Guzman et al.

(10) Patent No.: US 11,030,450 B2
(45) Date of Patent: Jun. 8, 2021

(54) SYSTEM AND METHOD FOR DETERMINING ORIGINALITY OF COMPUTER-GENERATED IMAGES

(71) Applicant: Vatbox, Ltd., Herzeliya (IL)

(72) Inventors: Noam Guzman, Ramat Hasharon (IL); Isaac Saft, Kfar Neter (IL)

(73) Assignee: Vatbox, Ltd., Herzeliya (IL)

( * ) Notice: Subject to any disclaimer, the term of this patent is extended or adjusted under 35 U.S.C. 154(b) by 204 days.

(21) Appl. No.: 16/421,001

(22) Filed: May 23, 2019

(65) Prior Publication Data

US 2019/0370541 A1  Dec. 5, 2019

Related U.S. Application Data

(60) Provisional application No. 62/678,289, filed on May 31, 2018.

(51) Int. Cl.
  *G06K 9/00* (2006.01)
  *G06K 9/32* (2006.01)
  *G06K 9/34* (2006.01)

(52) U.S. Cl.
  CPC ..... *G06K 9/00483* (2013.01); *G06K 9/00469* (2013.01); *G06K 9/3233* (2013.01); *G06K 9/344* (2013.01); *G06K 2209/01* (2013.01)

(58) Field of Classification Search
  CPC .......... G06K 9/00483; G06K 9/00469; G06K 9/3233; G06K 9/344; G06K 2209/01
  See application file for complete search history.

(56) References Cited

U.S. PATENT DOCUMENTS

| | | | | |
|---|---|---|---|---|
| 6,501,855 B1 * | 12/2002 | Zelinski | ............. | G06K 9/00865 382/186 |
| 6,507,826 B1 * | 1/2003 | Maners | ................ | G06Q 20/102 705/34 |

(Continued)

FOREIGN PATENT DOCUMENTS

| CN | 201955847 U | * | 8/2011 |
|---|---|---|---|
| CN | 107610320 A | * | 1/2018 |

(Continued)

OTHER PUBLICATIONS

Invoice Data Capture—Buy, Baterip Colin. Credit control, vol. 34, Iss. 8/9, 2013, pp. 41-48 (Year: 2013).*

*Primary Examiner* — Jayesh A Patel

(74) *Attorney, Agent, or Firm* — M&B IP Analysts, LLC

(57) ABSTRACT

A method and system for determining originality of computer-generated images of document evidence. The method includes receiving a plurality of computer-generated images of document evidence, wherein the plurality of computer-generated images includes at least one original document evidence generated by an approved source; generating a first electronic template for the at least one original document evidence, wherein the generation includes determining a first array of a plurality of regions of interest (ROIs); searching in an evidence repository for at least a second electronic template associated with at least a plurality of second images, wherein the second electronic template having a second array of a plurality of ROIs, wherein the first array of ROIs substantially matches the second array of ROIs; and associating the at least one original document evidence with a first originality tag including a first certainty level of originality and the verified entity.

20 Claims, 4 Drawing Sheets

(56) References Cited

U.S. PATENT DOCUMENTS

| | | | | |
|---|---|---|---|---|
| 7,992,853 | B2* | 8/2011 | Hayduchok | G06K 9/033 270/52.01 |
| 8,542,501 | B2* | 9/2013 | Kyono | H02M 3/285 363/21.02 |
| 8,965,134 | B2* | 2/2015 | Kompalli | G06K 9/00456 382/212 |
| 9,245,296 | B2* | 1/2016 | Nuggehalli | G06Q 40/12 |
| 9,824,270 | B1* | 11/2017 | Mao | G06K 9/033 |
| 10,095,920 | B2* | 10/2018 | Yellapragada | G06T 7/11 |
| 10,509,811 | B2* | 12/2019 | Guzman | G06K 9/00469 |
| 10,528,808 | B2* | 1/2020 | Lozano | G06F 40/205 |
| 10,621,676 | B2* | 4/2020 | Saft | G06K 9/325 |
| 2003/0139840 | A1* | 7/2003 | Magee | G06Q 30/06 700/133 |
| 2004/0181552 | A1* | 9/2004 | Milne | G06K 9/00221 |
| 2006/0040722 | A1* | 2/2006 | Manz | G07F 17/3234 463/16 |
| 2006/0095373 | A1* | 5/2006 | Venkatasubramanian | G06Q 20/102 705/40 |
| 2006/0219601 | A1* | 10/2006 | Babanats | B07C 3/14 209/3.3 |
| 2006/0229914 | A1* | 10/2006 | Armstrong, II | G16H 40/60 705/2 |
| 2007/0110277 | A1* | 5/2007 | Hayduchok | G06K 9/00442 382/101 |
| 2007/0229914 | A1* | 10/2007 | Matsuzawa | H04N 1/32128 358/474 |
| 2008/0095448 | A1* | 4/2008 | Ono | G06F 16/532 382/209 |
| 2008/0215489 | A1* | 9/2008 | Lawson | G07G 5/00 705/50 |
| 2008/0253656 | A1* | 10/2008 | Schwartzberg | G06K 9/3258 382/181 |
| 2010/0057586 | A1* | 3/2010 | Chow | G06Q 30/0601 705/26.1 |
| 2010/0202698 | A1* | 8/2010 | Schmidtler | G06K 9/00442 382/195 |
| 2014/0012742 | A1* | 1/2014 | Hanson | G06Q 20/322 705/40 |
| 2014/0079294 | A1* | 3/2014 | Amtrup | G06Q 20/10 382/112 |
| 2015/0012442 | A1* | 1/2015 | Ceribelli | G06Q 20/0425 705/45 |
| 2016/0371632 | A1* | 12/2016 | Lorenzini | G06K 9/3258 |
| 2017/0039422 | A1* | 2/2017 | Eschbach | G06F 21/64 |
| 2017/0169292 | A1* | 6/2017 | Guzman | G06K 9/00483 |
| 2017/0185832 | A1* | 6/2017 | Guzman | G06F 16/93 |
| 2017/0193608 | A1* | 7/2017 | Guzman | G06F 40/131 |
| 2017/0206409 | A1* | 7/2017 | Bataller | G06K 9/00456 |
| 2018/0012268 | A1* | 1/2018 | Simantov | G06Q 30/04 |
| 2018/0018338 | A1* | 1/2018 | Guzman | G06F 16/30 |
| 2018/0025224 | A1* | 1/2018 | Guzman | G06F 40/186 382/100 |
| 2018/0114060 | A1* | 4/2018 | Lozano | G06F 40/205 |
| 2019/0197337 | A1* | 6/2019 | Kanada | G06F 40/10 |
| 2019/0244048 | A1* | 8/2019 | Saft | G06K 9/2063 |
| 2019/0370541 | A1* | 12/2019 | Guzman | G06K 9/344 |
| 2020/0025912 | A1* | 1/2020 | Inaba | G01S 13/90 |

FOREIGN PATENT DOCUMENTS

| | | | |
|---|---|---|---|
| CN | 108717545 | A * | 10/2018 |
| CN | 109034154 | A * | 12/2018 |
| CN | 110751136 | A * | 2/2020 |
| CN | 111209792 | A * | 5/2020 |
| CN | 111222412 | A * | 6/2020 |

* cited by examiner

SYSTEM AND METHOD FOR DETERMINING ORIGINALITY OF COMPUTER-GENERATED IMAGES

CROSS-REFERENCE TO RELATED APPLICATIONS

This application claims the benefit of U.S. Provisional Application No. 62/678,289, filed on May 31, 2018, the contents of which are hereby incorporated by reference.

TECHNICAL FIELD

The disclosure generally relates to techniques for image processing, more specifically for determining originality of computer-generated images.

BACKGROUND

Enterprises all over the world often expense payments on goods and services purchased by the enterprises' employees in the course of their regular business dealings. Portions of these transactions may be refundable, by reclaiming a value added tax (VAT) or tax-deductible qualified expenses. Expenses often must be reported to the relevant tax authorities in order to reclaim a tax refund.

In some jurisdictions, enterprises may subtract the amount paid in VAT from a total tax amount owned to a tax authority by calculating any VAT paid by the enterprise for expenses that have a qualified business justification. In some countries, such subtraction may occur without providing an original price of evidences, e.g., a tax receipt, for such expenses. However, the original evidences may be required when an audit is conducted by the tax authority. Where an evidence is missing or in cases where the evidence is not an original one, the company may pay fines.

Currently, when evidences such as tax receipts are gathered in a large scale, the process of detecting whether a receipt is original or not may not only be time consuming for the entity reviewing the evidences, but may be time consuming for the parties of the transaction as well, if their input is required.

There are available solutions by which enterprises collect and analyze data associated with expenses and purchases made by their employees. Examples for such solutions include, capturing images of invoices using the employees' smartphones, uploading the captured images to a cloud computing platform, aggregating invoices, analyzing invoices, and generating reports respective thereof, and so on. However, such solutions do not provide an efficient method of determining a certainty level of originality for a plurality of evidences.

It would therefore be advantageous to provide a solution addressing the above-noted need.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for determining originality of computer-generated images of document evidence. The method comprises receiving a plurality of computer-generated images of document evidence, wherein the plurality of computer-generated images includes at least one original document evidence generated by an approved source; generating a first electronic template for the at least one original document evidence, wherein the generation includes determining a first array of a plurality of regions of interest (ROIs); searching in an evidence repository for at least a second electronic template associated with at least a plurality of second images, wherein the second electronic template having a second array of a plurality of ROIs, wherein the first array of ROIs substantially matches the second array of ROIs, wherein the plurality of second images are associated with at least one verified entity; and associating the at least one original document evidence with a first originality tag including a first certainty level of originality and the verified entity, wherein the first certainty level is based on the match between the first array of ROIs and the second array of ROIs.

Certain embodiments disclosed herein include a method for determining originality of computer-generated images of document evidence. The method includes a processing circuitry and a memory; the memory containing instructions that, when executed by the processing circuitry, configure the system to: receive a plurality of computer-generated images of document evidence, wherein the plurality of computer-generated images includes at least one original document evidence generated by an approved source; generate a first electronic template for the at least one original document evidence, wherein the generation includes determining a first array of a plurality of regions of interest (ROIs); search in an evidence repository for at least a second electronic template associated with at least a plurality of second images, wherein the second electronic template having a second array of a plurality of ROIs, wherein the first array of ROIs substantially matches the second array of ROIs, wherein the plurality of second images are associated with at least one verified entity; and associate the at least one original document evidence with a first originality tag including a first certainty level of originality and the verified entity, wherein the first certainty level is based on the match between the first array of ROIs and the second array of ROIs.

BRIEF DESCRIPTION OF THE DRAWINGS

The subject matter that is regarded as the disclosure is particularly pointed out and distinctly claimed in the claims at the conclusion of the specification. The foregoing and other objects, features and advantages of the disclosure will be apparent from the following detailed description taken in conjunction with the accompanying drawings.

DETAILED DESCRIPTION

Figure 1:
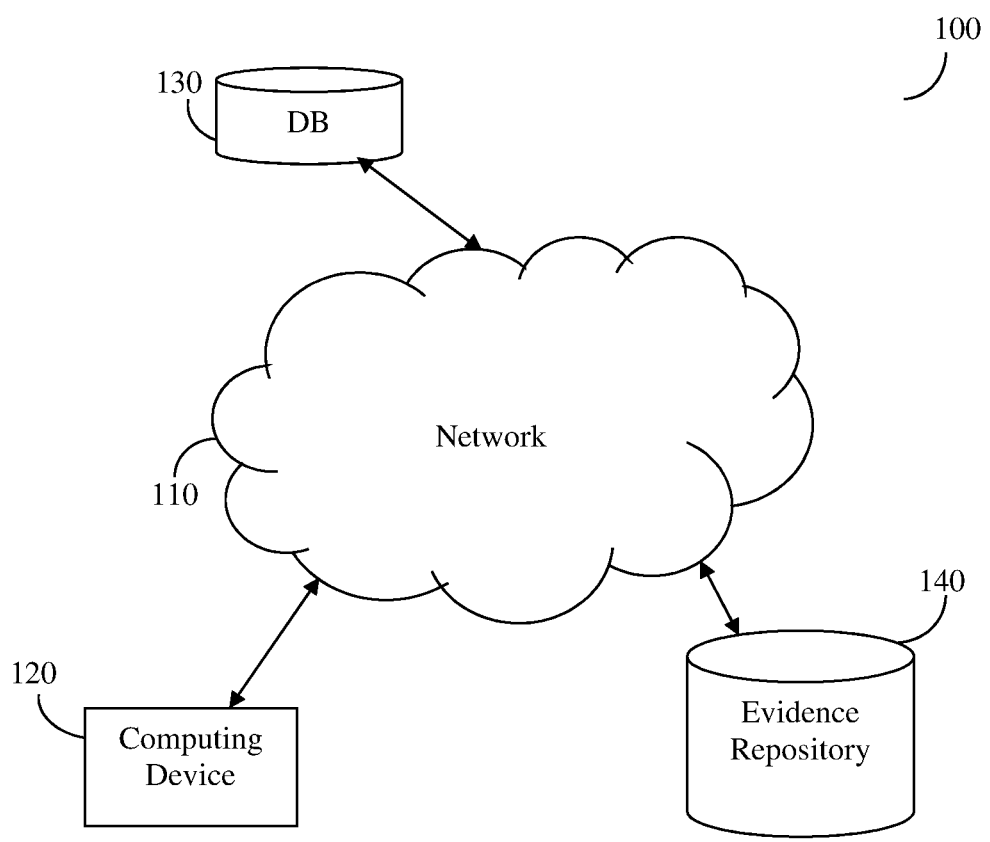
FIG. 1 is a network diagram utilized to describe the various disclosed embodiments.

It is important to note that the embodiments disclosed by the disclosure are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

According to some example embodiments, techniques for determining the originality of images of document evidence are stored in a database. The determination is based on identifying the source utilized to generate a first image of the images being analyzed. A template of the first image is compared to a second template of a previously analyzed image generated by the same source. When the first and second templates are similar to some degree, a first certainty level of originality is determined, and an originality tag is formed. The certainty level includes a certainty level of originality and a name of the entity that issued an image of the second image. The entity is associated with the first image. In an embodiment, the document evidence is an image or a receipt to be expensed, i.e., expense evidence.

FIG. 1 shows an example network diagram 100 utilized to describe the various disclosed embodiments. In the example network diagram 100, a computing device 120, a database 130, and an evidence repository 140 are connected via a network 110. The network 110 may be, but is not limited to, a wireless, cellular or wired network, a local area network (LAN), a wide area network (WAN), a metro area network (MAN), the Internet, the worldwide web (WWW), similar networks, and/or any combination thereof.

The database 130 is configured to store images of document evidences. Such images may include, but are not limited to, evidentiary electronic documents including information related to transactions. The evidentiary electronic documents may include, but are not limited to, invoices, receipts, notes, statements, bills, and the like.

The evidence repository 140 is configured to store original images of document evidences that were generated by at least one approved source and are identified as original computer-generated images. The source may be an optical character recognition (OCR) product.

Original images of document evidences are evidences generated by an approved source (e.g., a software product). An original image may be associated with an evidence template identifying a certain entity issuing the document evidence. The entity may be, for example, a vendor of the services or goods to be expensed. A car rental company, a hotel and a restaurant, are some examples of vendors.

Thus, in an embodiment, the evidence repository 140 may contain images of previously analyzed document evidences. An entity designated in the document evidence is identified and the respective image is tagged with the entity. For example, an image of a receipt of from Hilton® London Paddington hotel is tagged with "Hilton" and the image and tag are saved in the repository 140. The evidence repository 140 is further configured to include an electronic template of each image in the repository. The template includes an array of regions of interest (ROIs). ROIs are portions of an image of document evidences. For example, the document evidence may be a receipt and the ROI may be a logo, a transaction total amount, a VAT amount, a vendor's name, a vendor's identification number, or a vendor's address, and/or so on.

The computing device 120 is configured to receive computer-generated images of document evidences. Computer-generated images of document evidences may include electronic files captured by a smartphone, a laptop, a personal computer (PC), a scanner, or any other electronic means and/or software capable of capturing or receiving (paper or electronic) documents. The computer-generated images may be stored in the database 130. That is, the database 130 may contain original and non-original images of such evidence expenses. A non-original image of document evidence may be, for example, an image of a receipt scanned by a smartphone. An original image of document evidence may be, for example, an image that was generated by an approved source, such as SAP Business One®.

In an embodiment, the computing device 120 is configured to select all computer-generated images determined to be produced by an approved source. Such selection is based on metadata associated with such computer-generated images. The determination of whether a software is approved or not may be achieved using a list of approved sources maintained, for example, in a database. The list may be constantly updated with any new approved sources (software products, electronic means, and the like).

In one embodiment, the computing device 120 is configured to generate an electronic template for a computer-generated image. As noted above, such a template may include an array of ROIs. In an embodiment, the computing device 120 is further configured to search in the evidence repository 140 for an electronic template associated with images stored therein and compared between the computer-generated images. In an embodiment, the comparison is based on the ROIs in the respective template. That is, a first template of a computer-generated image is comparted to a second template of an image stored in the evidence repository 140.

When the ROIs of the two templates match at least one predefined threshold, the images are considered to be matched. Matched templates, hence images, may be similar or identical. For example, a first threshold may be set to 60% matched ROIs and a second threshold may be set to 80% matched ROIs. When the first threshold is crossed, the images are considered similar, and when the second threshold is crossed, the images are considered identical. In an embodiment, two ROIs are considered to be matched when their content and location (position within the image) are the same.

When a match is found, the computing device 120 is configured to associate a tag of a matched image, found in the repository, to the matching computer-generated image. The tag determines if the tag is original or not. It should be noted that the comparison of a computer-generated image may be performed against each image stored in the repository 140, until a match is found.

It should be further noted that the example implementation shown in FIG. 1 is described with respect to a single computing device 120, a database 130, and the evidence repository 140 merely for simplicity purposes and without limitation on the disclosed embodiments. The computing device 120 may be deployed in a cloud computing platform, a data center, or both. In some example embodiments, the process for determining originality of computer-generated images may be provided with a cloud service.

Figure 2:
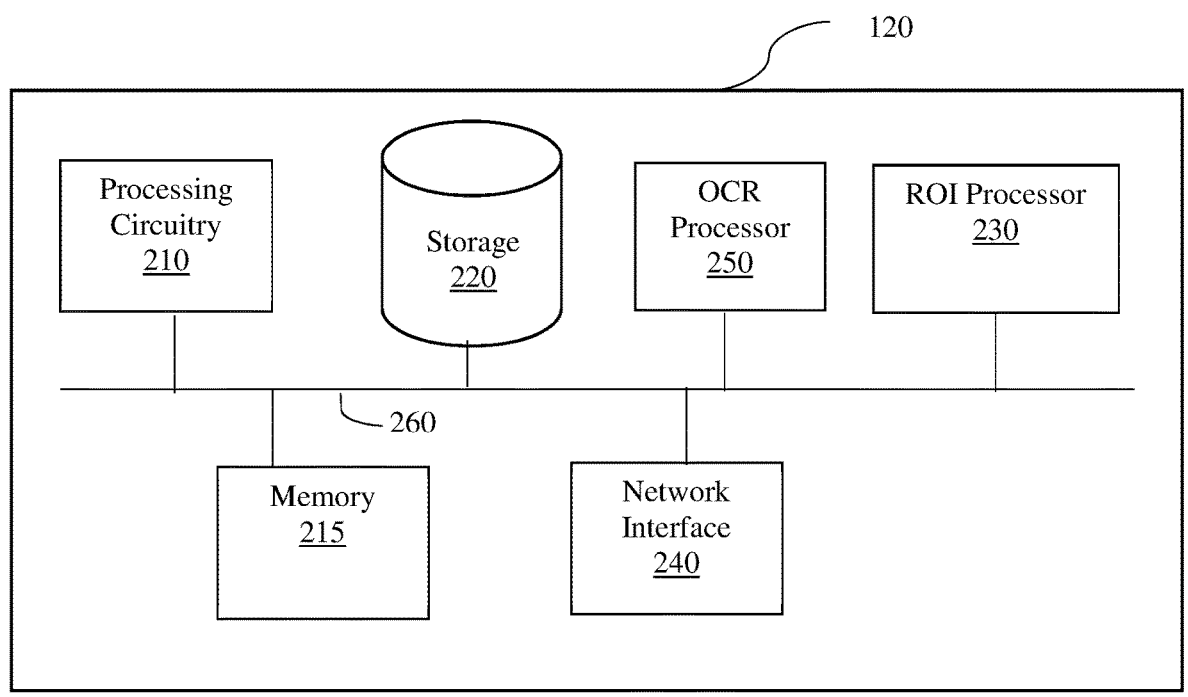
FIG. 2 is a schematic diagram of a computing device according to an embodiment.

FIG. 2 is an example schematic diagram of the computing device 120 according to an embodiment. The computing device 120 includes a processing circuitry 210 coupled to a memory 215, a storage 220, a ROI processor 230, a network interface 240, and an OCR processor 250. In the embodiment, the components of the computing device 120 may be communicatively connected via a bus 260.

The processing circuitry 210 may be realized as one or more hardware logic components and circuits. For example, and without limitation, illustrative types of hardware logic components that can be used, include: field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, or hardware description language. Instructions may include code in formats such as: source code, binary code, executable code, or any other suitable format of code. The instructions, when executed by the one or more processing circuitry 210, cause the processing circuitry 210 to perform the various processes described herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The ROI processor 230 may be configured to identify ROIs in an image of document evidence. The ROI is a portion of an image of document evidence. For example, the document evidence may be a receipt, and the ROI may be a logo, a transaction total amount, a VAT amount, a vendor's name, a vendor's identification number, a vendor's address, and so on. Specifically, in an embodiment, the ROI processor 230 is configured to identify a plurality of ROIs in each image of document evidence, such that an array of ROIs is determined and can be utilized to generate a template for the image of document evidence. The ROI processor 230 may be realized as a processing circuitry.

The network interface 240 allows the computing device 120 to communicate with the database 130, the evidence repository 140, for the purpose of, for example, retrieving data, storing data, and the like.

In an embodiment, the computing device 120 includes an OCR processor 250 including, but not limited to, a feature and/or pattern recognition unit (RU) configured to identify patterns, features, or both, in unstructured data sets. Specifically, in an embodiment, the OCR processor 250 is configured to identify characters in an unstructured data set of a copy of an image of document evidence. The identified characters may be utilized to determine whether a content of a first image and a content of a second image is similar above a certainty level as further described herein below.

It should be understood that the embodiments described herein are not limited to the specific architecture illustrated in FIG. 2, and other architectures may be equally used without departing from the scope of the disclosed embodiments.

Figure 3:
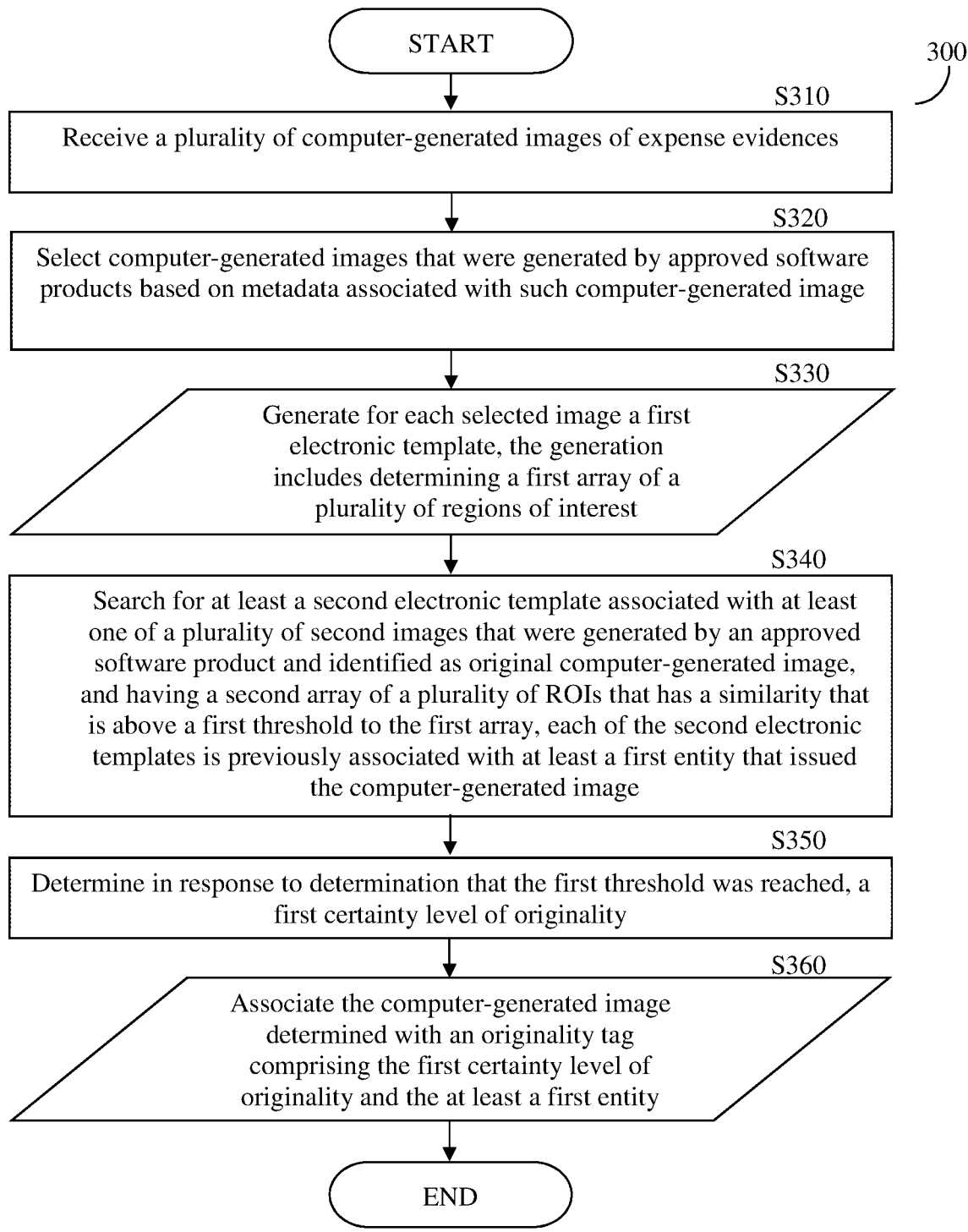
FIG. 3 is a flowchart illustrating a method for associating a computer-generated image of document evidence with a first originality tag according to an embodiment.

FIG. 3 is an example flowchart 300 illustrating a method for determining the originality of computer-generated images of document evidences according to an embodiment. For each computer-generated image determined to be original, a tag is associated therewith. In an embodiment, the method may be performed by the computing device 120. For sake of simplicity and without limiting the scope of the disclosed embodiments, the method will be described with reference to processing of a single computer-generated image.

At S310, a computer-generated image of document evidence is received. The image may be received from an end-point device, a server, a database (e.g., database 130, FIG. 1) or any device capable of uploading images. The received computer-generated image may include, for example, an original image or a non-original image of document evidence. As noted above, an original image is generated by an approved source. Examples of which are provided above.

At S320, it is determined if the received computer-generated image is an original image. The determination is based on metadata associated with the computer-generated image. The metadata of the computer-generated image is indicative of the source, i.e. if the source is approved or not. As noted above, the determination of whether or not a software product generated the image may be achieved by analyzing the image, for example, using a computer vision technique. A list of approved sources (e.g., a software product or electronic device) is utilized to determine if the source is approved or not.

At S330, a first electronic template is generated for the computer-generated image determined to be an original image. This includes identifying ROIs and encapsulating such ROIs. The template includes an array of ROIs.

At S340, a search for a matching image in the evidence repository is performed. Specifically, a search for a template ("a second template") matching the first electronic template is performed. The second template is from images previously generated by an approved source and identified as original computer-generated images. In an embodiment, when the ROIs of the first and second templates match over at least one predefined threshold, the images are considered to be matched. Matched templates, and hence images, may be similar or identical.

As an example, the first entity may be a vendor that issued a tax receipt. The search is performed in the evidence repository 140 containing original images of document evidences, e.g. tax receipts, that were previously analyzed. When the tax receipts of such templates are determined, the entity, e.g. vendor, associated with the template is identified, and so on. The evidence repository may further contain a corresponding tag for each image and/or template stored therein.

At S350, a certainty level is determined for the received computer-generated image based on the comparison of the first and second template. The certainty level is determined based on the crossing of any of the least one threshold. For example, a first certainty level of originality may indicate that the probability that a first electronic template associated with a first image and a second electronic template associated with an original second image, are identical is above 90%. The probability may be changed according to the number of second electronic templates identified as similar above the first threshold. For example, a second image is previously associated with a first entity and the template of the second image is also previously determined, only when a first template of a first image matches the template of the second image, the certainty level of originality may be relatively high.

At S360, the computer-generated image having a certainty level over a certain threshold is associated with the originality tag. The tag is an electronic descriptive means by which the computing device associates the certainty level of originality and the identity of the entity that initially issued the image (document evidence), with the determined computer-generated image. For example, the first originality tag may indicate that the certainty level of originality is 95% and the entity, i.e. the vendor, is Hilton® London Paddington.

In an embodiment, the computing device 120 may be configured to remove images generated by unapproved software products.

Figure 4:
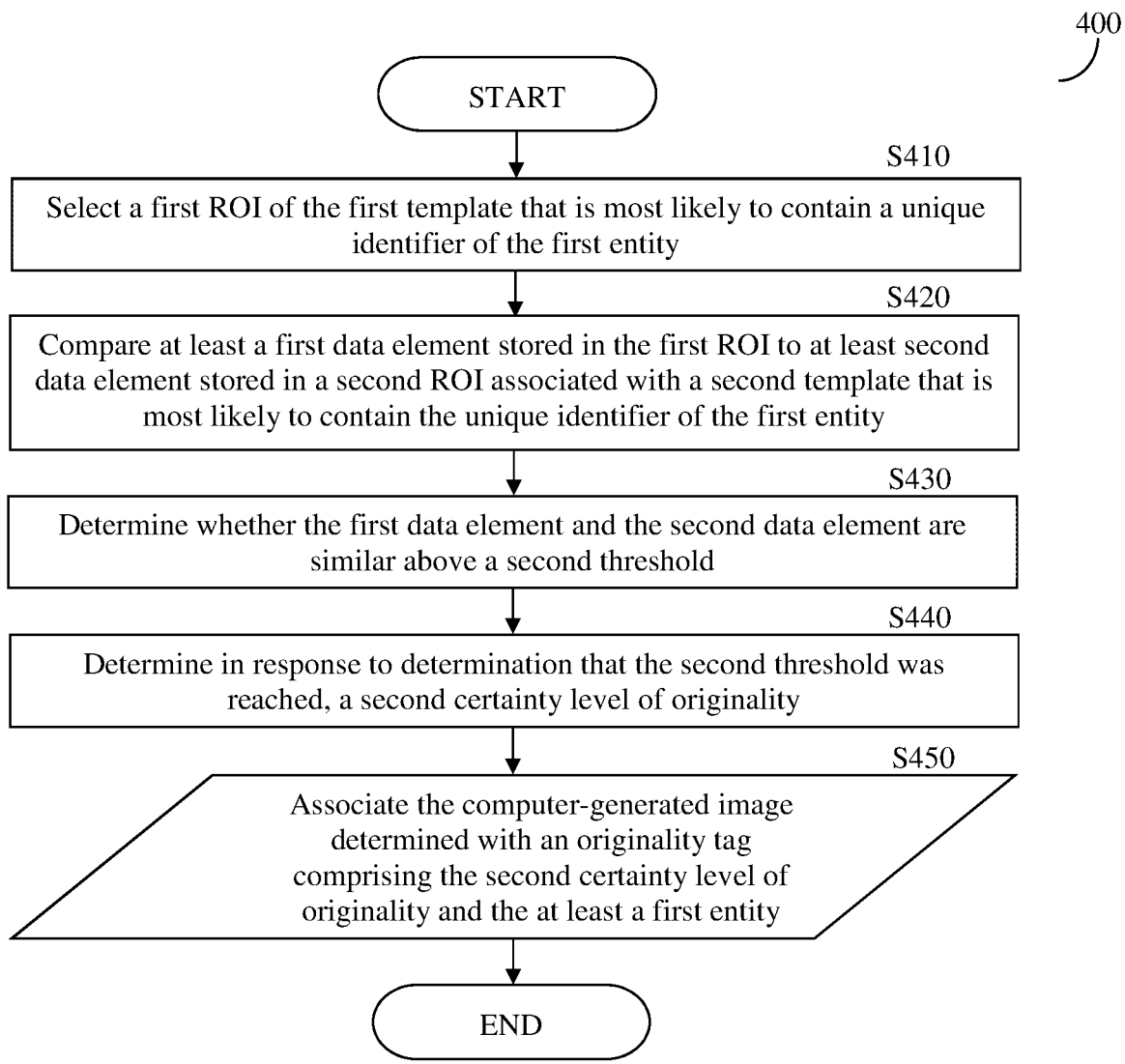
FIG. 4 is a flowchart illustrating a method for associating a computer-generated image of document evidence with a second originality tag according to an embodiment.

FIG. 4 is an example flowchart 400 illustrating a method for associating a computer-generated image of a document evidence with a second originality tag according to an embodiment. In an embodiment, the method may be performed by the computing device 120. The method described below with respect of FIG. 4 may be executed as an additional step of processing the plurality of computer-generated images upon determination that the first certainty level of originality, discussed above with reference to FIG. 3, is below a predetermined value. For example, it may be determined that when the first certainty level of originality is below 90%, it is desirable to determine a second certainty level of originality. The second certainty level of originality provides an enhanced determination capability of the originality of the image with respect to the first certainty level of originality, as the method by which the second certainty level is achieved analyzes fields and content within a ROI of the images as further described below.

At S410 a first ROI of a first template is selected. The first template is of a computer-generated image of document evidence of a plurality of images that were generated by an approved software product, that is most likely to contain a unique identifier of an entity issuing the document evidence. The unique identifier may be, for example, a logo of a vendor that in most cases appears in the top center of the image.

At S420, a first data element stored in the first ROI is compared to the at least second data element stored in a second ROI associated with a second template that is most likely to contain the unique identifier of the first entity. As further discussed herein above with respect of FIG. 3, the second template is previously analyzed such that the identity of the entity, i.e., an entity (vendor) associated with the template is identified. The data element may be for example, a logo, an address, a phone number, etc. that is associated with the entity.

At S430, it is determined whether the first data element and the second data element are similar above a second threshold. The second threshold may be reached if the first data element and the second data element are identical. According to another embodiment, the second threshold may be reached even when a slight error exists, such as an erased letter.

At S440, it is determined whether or not a second certainty level of originality is reached according to the determination of the second threshold. The second level of originality may be higher than the first certainty level of originality discussed above with reference to FIG. 3. For example, in response to the determination that the first template of a first image is similar above a first threshold to a group of five second templates of five different second images, the first certainty level is determined to be 70%. According to the same example, based on analyzing the data element existing within the first ROI with respect to the data elements of the second ROIs of the five second images, the computing device 120 is able to determine that the first data element is identical in 100% to only one of the five images that were initially identified as similar to the first image.

At S450 the determined computer-generated image is associated with a second originality tag comprising the second certainty level of originality and the at least a first entity. The second originality tag is an electronic descriptive means by which the computing device 120 associates the second certainty level of originality and the identity of the entity that initially issued the image, with the determined computer-generated image.

According to another embodiment, after the first certainty level of originality and the originality tag are determined and associated with a first computer-generated image (hereinafter: the first image), the entity (e.g., vendor) issuing the first image is determined. Thus, the computing device 120 is configured to send a request for receiving a copy of the first image from a server (not shown) associated with the identified entity. The copy of the first image is an electronic document that contains similar content items to the content items of the original first image. However, the copy is not considered an original evidence to the expense made. The copy may be electronically received from the entity's server by the computing device 120. The copy may include content items (e.g., words, numbers, logos, and the like) that may exist also at the first image. In an embodiment, by analyzing the content items of both the first image and the copy of the first image, the computing device 120 is configured to determine whether the two documents are similar above a third certainty level as further described herein below.

In response to receiving the copy of the first image, the computing device 120 may be configured to perform a first analysis on the copy of the first image using, for example, one or more computer vision techniques in order to identify content items associated with the copy of the first image. According to another embodiment, a second analysis may be performed by the computing device 120 on the first image using, for example, one or more computer vision techniques in order to identify content items associated with the first image. Then, the results of the first analysis and the results of the second analysis are compared for determining whether a predetermined number of content items of the first image and of the copy of the first image are similar above a predetermined level. The copy may include, for example, content items such as transaction amount, value added tax (VAT) amount, vendor's address, and the like. Then, a third certainty level of originality is determined. The third certainty level represents the probability that the first image is an original document evidence by comparing a predetermined number of content items that exist in both the first image and the copy of the first image. Then, the computing device 120 associates the first image, after determining that the copy comprises at least the predetermined number of similar content items, with a third originality tag comprising the third certainty level of originality and the at least a first entity that originally issued the first image. The third originality tag is an electronic descriptive means by which the computing device 120 associates the third certainty level of originality and the identity of the entity that initially issued the image, with the determined computer-generated image.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination. All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for determining originality of computer-generated images of document evidence, comprising:
   receiving a plurality of computer-generated images of document evidence, wherein the plurality of computer-generated images includes at least one original document evidence generated by an approved source;
   generating a first electronic template for the at least one original document evidence, wherein the generation includes determining a first array of a plurality of regions of interest (ROIs);
   searching in an evidence repository for at least a second electronic template associated with at least a plurality of second images, wherein the second electronic template having a second array of a plurality of ROIs, wherein the first array of ROIs substantially matches the second array of ROIs, wherein the plurality of second images are associated with at least one verified entity; and
   associating the at least one original document evidence with a first originality tag including a first certainty level of originality and the at least one verified entity, wherein the first certainty level is based on the match between the first array et ROIs and the second array of ROIs.

2. The method of claim 1, wherein the first certainty level is determined based on a percentage of matching ROIs between the first array of ROIs and the second array of ROIs.

3. The method of claim 1, further comprising: determining a second certainty level of originality for the at least one original document evidence based on contents of the first array of ROIs and the second array of ROIs.

4. The method of claim 3, further comprising:
   selecting at least a first ROI of the first electronic template containing a unique identifier of the at least one verified entity;
   comparing a first data element stored in the first ROI to a second data element stored in a second ROI associated with a second template, wherein the second ROI containing the unique identifier of the at least one verified entity;
   determining whether the first data element and the second data element match; and
   associating the at least one original document evidence with at least second originality tag containing the at least one verified entity.

5. The method of claim 1, wherein the approved source includes an approved optical character recognition (OCR) product.

6. The method of claim 1, wherein a computer-generated image is determined to be an original document evidence based on a metadata associated with the corresponding computer-generated image.

7. The method of claim 1, further comprising:
   sending, to a server associated with the at least one verified entity, a request for receiving a copy of a computer-generated image corresponding to the at least one original document evidence; and
   receiving the requested copy of the computer-generated image;
   comparing the received copy of the computer-generated image to the at least one original document evidence;
   based on the comparison, determining a third certainty level of originality; and
   associating the at least one original document evidence with a third originality tag including the third certainty level of originality.

8. The method of claim 7, further comprising:
   processing the received copy using a computer vision technique.

9. The method of claim 1, wherein the method is performed by a computing system.

10. The method of claim 1, wherein each of the at least one original document evidence is at least expense evidence.

11. A non-transitory computer readable medium having stored thereon instructions for causing a processing circuitry to perform a process for determining originality of computer-generated images of document evidence, the process comprising:
    receiving a plurality of computer-generated images of document evidence, wherein the plurality of computer-generated images includes at least one original document evidence generated by an approved source;

generating a first electronic template for the at least one original document evidence, wherein the generation includes determining a first array of a plurality of regions of interest (ROIs);
searching in an evidence repository for at least a second electronic template associated with at least a plurality of second images, wherein the second electronic template having a second array of a plurality of ROIs, wherein the first array of ROIs substantially matches the second array of ROIs, wherein the plurality of second images are associated with at least one verified entity; and
associating the at least one original document evidence with a first originality tag including a first certainty level of originality and the at least one verified entity, wherein the first certainty level is based on the match between the first array of ROIs and the second array of ROIs.

12. A system for determining originality of computer-generated images of document evidence, comprising:
a processing circuitry; and a memory, the memory containing instructions that, when executed by the processing circuitry, configure the system to:
receive a plurality of computer-generated images of document evidence, wherein the plurality of computer-generated images includes at least one original document evidence generated by an approved source;
generate a first electronic template for the at least one original document evidence, wherein the generation includes determining a first array of a plurality of regions of interest (ROIs);
search in an evidence repository for at least a second electronic template associated with at least a plurality of second images, wherein the second electronic template having a second array of a plurality of ROIs, wherein the first array of ROIs substantially matches the second array of ROIs, wherein the plurality of second images are associated with at least one verified entity; and
associate the at least one original document evidence with a first originality tag including a first certainty level of originality and the at least one verified entity, wherein the first certainty level is based on the match between the first array et ROIs and the second array of ROIs.

13. The system of claim 12, wherein the first certainty level is determined based on a percentage of matching ROIs between the first array of ROIs and the second array of ROIs.

14. The system of claim 13, wherein the system is further configured to:
determine a second certainty level of originality for the at least one original document evidence based on contents of the first array of ROIs and the second array of ROIs.

15. The system of claim 13, wherein the system is further configured to:
select at least a first ROI of the first electronic template containing a unique identifier of the at least one verified entity;
compare a first data element stored in the first ROI to a second data element stored in a second ROI associated with a second template, wherein the second ROI containing the unique identifier of the at least one verified entity;
determine whether the first data element and the second data element match; and
associate the at least one original document evidence with at least second originality tag containing the at least one verified entity.

16. The system of claim 12, wherein the approved source includes an approved optical character recognition (OCR) product.

17. The system of claim 12, wherein a computer-generated image is determined to be an original document evidence based on a metadata associated with the corresponding computer-generated image.

18. The system of claim 12, wherein the system is further configured to:
send, to a server associated with the at least one verified entity, a request for receiving a copy of a computer-generated image corresponding to the at least one original document evidence; and
receive the requested copy of the computer-generated image;
compare the received copy of the computer-generated image to the at least one original document evidence;
based on the comparison, determine a third certainty level of originality; and
associate the at least one original document evidence with a third originality tag including the third certainty level of originality.

19. The system of claim 18, wherein the system is further configured to:
process the received copy using a computer vision technique.

20. The system of claim 12, wherein each of the at least one original document evidence is at least expense evidence.

* * * * *